A. SONANDER.
SCALE.
APPLICATION FILED JULY 1, 1919.
1,379,726.
Patented May 31, 1921.
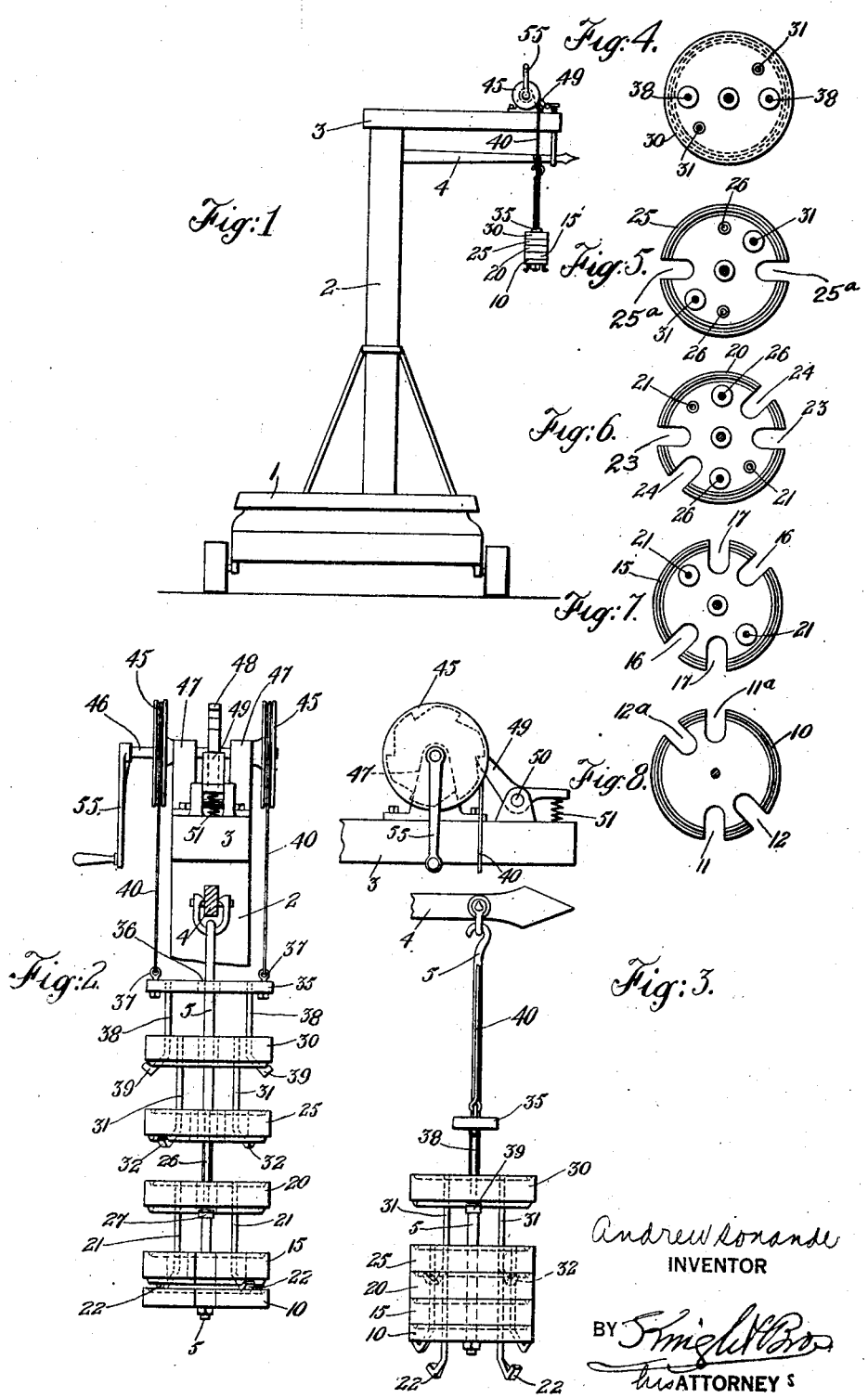
Andrew Sonander
INVENTOR
BY
his ATTORNEYS

UNITED STATES PATENT OFFICE.

ANDREW SONANDER, OF RUTLAND, VERMONT, ASSIGNOR TO HOWE SCALE COMPANY, OF RUTLAND, VERMONT, A CORPORATION.

SCALE.

1,379,726.

Specification of Letters Patent.  Patented May 31, 1921.

Application filed July 1, 1919. Serial No. 307,973.

*To all whom it may concern:*

Be it known that I, ANDREW SONANDER, a citizen of the United States, residing at Rutland, county of Rutland, State of Vermont, have invented certain new and useful Improvements in Scales, of which the following is a specification.

The present invention relates to an improved construction and arrangement of counterpoise weights for increasing the weighing range of balance scales.

A plurality of counterpose weights are supported in a vertical series, by suitable adjustable, flexible means having lost motion connection with the uppermost weight, which in turn, has lost motion connection with the second weight, and so on throughout the series, each weight normally supporting the weights suspended beneath it. This series of counterpoise weights is supported in operative relation to a poise rod and pan of a scale beam, so that by lengthening out the flexible supporting means, one or more of the counterpoise weights can be rested upon the poise pan, or by shortening the flexible supporting means, some or all of the weights can be raised off the poise pan.

In the preferred construction of the present invention, a series of counterpoise weights are arranged one above another with the poise rod extending loosely through a central guide opening of all the weights, while each weight above the bottom one is provided with two or more depending hook rods passing freely through openings in the adjacent weights beneath, and engaging beneath the same to afford lost motion suspension connections. The adjustable means for suspending the series of counterpoise weights may consist of two pulley wheels mounted upon a common shaft, operated by a crank handle and held in the desired adjusted position by means of a ratchet wheel and a stop dog. Wound upon the pulleys are suitable cords, chains or cables connected with a suspension bar from which the series of counterpoise weights are supported by lost motion connection devices. By adjusting the weight suspending means, more or less of the counterpoise weights may be placed in operation.

In the accompanying drawings, the invention is shown in its elementary form as applied to a simple form of platform scale, but it should be understood at the outset that the invention is of general application in that it can be employed in connection with a scale beam of any form of scale, including the automatic scale balances.

In the accompanying drawings,

Figure 1 is a view of a simple form of platform scale having the present invention applied thereto;

Fig. 2 is an enlarged end elevation of the approved counterpoise mechanism;

Fig. 3 is a detail side elevation of the same;

Figs. 4, 5, 6, 7, and 8 are detail plan views of the separate counterpoise weights and the poise pan, of the preferred forms for carrying out the present invention.

In the platform scale illustrated in Fig. 1 of the drawings, 1 is the platform, 2 the pillar, 3 the cross bar or head and 4 the scale beam from which is hung in the ordinary manner the poise rod 5 carrying at its lower end the poise pan 10 of peculiar construction. Poise pan 10 is formed with two pairs of oppositely arranged radial recesses 11, 11$^a$ and 12, 12$^a$, to allow freedom of movement of two pairs of weight suspending hook rods presently to be explained.

15, 20, 25, 30 are the four counterpoise weights, each one formed with a central opening for the free passage of the counterpoise rod 5 through which said rod is adapted to freely reciprocate in the weighing operation. 35 is a weight supporting bar formed with a central opening 36 through which rod 5 freely passes, and provided with eyes 37 to which are attached the flexible cords or cables 40 which extend around the grooved pulleys 45 secured upon a shaft 46 journaled in bearing blocks 47 mounted upon the head 3 of the scale frame. The shaft 46 carries a ratchet wheel 48 with which coöperates a stop dog 49 pivoted at 50 upon the head 3 and thrown normally into engagement with ratchet wheel 48 by spring 51. 55 is a hand lever by which the pulleys 45 can be rotated either forward or back for winding up and shortening, or unwinding and lengthening the flexible weight supports 40.

This weight-supporting bar 35 suspended upon the cables 40 carries two downwardly extending suspension rods 38 formed at their lower ends with outwardly presented hooks 39. These rods 38 pass freely through diametrically opposite openings formed in the upper counterpoise weight 30 and engage the flanged lower face of said weight 30 for suspending it and the weights beneath from the adjustable supporting means just described.

The counterpoise weight 30 has secured to it two depending hook rods 31 which pass freely through suitable vertical openings in the adjacent counterpoise weight 25 and are formed at their lower ends with hooks 32 adapted to engage the undersurface of the weight 25.

Weight 25 has secured to it in turn, the depending hook rods 26 passing freely through vertical openings in the weight 20 and formed at their lower ends with the hooks 27 to engage the undersurface of weight 20. Weight 20 carries the hook rods 21 which pass through suitable vertical openings in the counterpoise weight 15 and are formed at their lower ends with hooks 22 adapted to engage the undersurface of said weight 15.

The weight 25 is formed with diametrically opposite recesses 25$^a$ to allow free passage of the hook ends 39 of rods 38 in the operation of moving the counterpoise weights together, or of separating them. The weight 20 is formed with diametrically opposite recesses 23 to receive the hook ends 39 and also the diametrically opposite recesses 24 to receive the hook ends 32 of rods 31. Counter weight 15 has the opposite recesses 16 to receive hook ends 32 and also the opposite recesses 17 to receive the hook ends 27 of rods 26. The recesses 11 and 11$^a$ of poise pan 10 receive the hook ends 27 of rods 26, while the recesses 12, 12$^a$ of the pan receive the hook ends 22 of rods 21.

The purpose of the invention will be better understood from the following description of the operation. In the normal position of the scale, the cables 40 are wound up sufficiently to support all of the counter weights, free of the poise rod 5 and pan 10. In this position the scale has a certain limited capacity. If it is desired to weigh an article above the normal capacity but within the capacity of the scale with one counterpoise weight resting upon the pan 10, the operator disengages dog 49 from ratchet wheel 48 and unwinds cables 40 sufficiently to let the lowest counterweight 15 rest upon pan 10, when the scale is operated in the usual way, the pan 10 supporting weight 15 being free to move upwardly and downwardly within the limits of the scale beam, the poise rod 5 sliding through the other suspended counterpoise weights during the weighing operation. In the same manner, counterpoise weights 20, 25 and 30 can be deposited upon the poise pan, the suspension hooks operating freely in the recesses of the poise weights to permit the operator to move them into or out of their operating positions.

I claim:

1. In a device of the character described, the combination with a scale beam having a suspended poise rod and pan, a series of counterpoise weights, each formed with a central opening to receive said poise rod and suspension hooks depending from it to engage another weight, and adjustable means for supporting said weights, including a crank shaft, pulleys upon said shaft, cables upon said pulleys connected with said weights and means for holding said shaft against movement.

2. In a device of the character described, the combination with a scale beam having a suspended poise rod and pan, a series of counterpoise weights formed with central openings to receive said poise rod, each weight having suspension hooks depending from it and engaging the next weight below, and some of said counterpoise weights having recesses or openings to permit the free passage of the hooks, a crank shaft, pulleys upon said shaft, cables upon said pulleys connected with said weights and a dog and ratchet device for holding said shaft against movement.

3. In a device of the character described, the combination with a scale beam having a suspended poise rod and a recessed pan, a series of counterpoise weights formed with central openings to freely receive said poise rod, each weight having suspension hooks depending from it and recesses or openings to permit the free passage of the hooks, said suspension hooks and recesses of the several weights being staggered to avoid interference, and adjustable means for supporting said weights, including a crank shaft, pulleys upon said shaft, cables upon said pulleys connected with said weights and a dog and ratchet device for holding said shaft against movement.

ANDREW SONANDER.